US012476373B2

(12) United States Patent
Peng et al.

(10) Patent No.: US 12,476,373 B2
(45) Date of Patent: Nov. 18, 2025

(54) COMMUNICATION DEVICE

(71) Applicant: Wistron NeWeb Corp., Hsinchu (TW)

(72) Inventors: Yen-Tze Peng, Hsinchu (TW); Pao-Chuan Peng, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 156 days.

(21) Appl. No.: 18/461,775

(22) Filed: Sep. 6, 2023

(65) Prior Publication Data

US 2024/0113432 A1 Apr. 4, 2024

(30) Foreign Application Priority Data

Sep. 29, 2022 (TW) .................................. 111136937

(51) Int. Cl.
*H01Q 1/22* (2006.01)
*H01Q 9/04* (2006.01)

(52) U.S. Cl.
CPC ......... *H01Q 9/0414* (2013.01); *H01Q 1/2291* (2013.01); *H01Q 9/0421* (2013.01)

(58) Field of Classification Search
CPC .. H01Q 9/0414; H01Q 1/2291; H01Q 9/0421; H01Q 5/371; H01Q 1/2258
See application file for complete search history.

(56) References Cited

U.S. PATENT DOCUMENTS

| | | | | |
|---|---|---|---|---|
| 10,879,606 B2 | 12/2020 | Ruaro et al. | | |
| 2011/0006953 A1* | 1/2011 | Chiang | G06F 1/1698 | 343/702 |
| 2014/0118198 A1* | 5/2014 | Kawashimo | H01Q 1/42 | 343/702 |
| 2014/0132463 A1* | 5/2014 | Hobson | H04M 1/0202 | 343/702 |
| 2014/0335785 A1* | 11/2014 | Kato | H01Q 1/2266 | 455/41.1 |
| 2015/0214620 A1* | 7/2015 | Yosui | H01Q 1/243 | 343/702 |
| 2015/0364815 A1* | 12/2015 | Yong | H01Q 1/243 | 343/702 |
| 2018/0101274 A1* | 4/2018 | Uttermann | G08C 17/02 | |
| 2019/0074586 A1* | 3/2019 | Ruaro | H01Q 9/04 | |
| 2019/0356051 A1* | 11/2019 | Barrera | H01Q 1/44 | |

FOREIGN PATENT DOCUMENTS

| | | |
|---|---|---|
| CN | 111052498 U | 4/2020 |

* cited by examiner

*Primary Examiner* — Dameon E Levi
*Assistant Examiner* — Michael M Bouizza
(74) *Attorney, Agent, or Firm* — McClure, Qualey & Rodack, LLP

(57) ABSTRACT

A communication device with high radiation efficiency includes a click pad frame, a metal wall, and an antenna structure. The metal wall is coupled to the click pad frame. The antenna structure is coupled to the click pad frame. The click pad frame is disposed between the metal wall and the antenna structure.

20 Claims, 8 Drawing Sheets

500

COMMUNICATION DEVICE

CROSS REFERENCE TO RELATED APPLICATIONS

This application claims priority of Taiwan Patent Application No. 111136937 filed on Sep. 29, 2022, the entirety of which is incorporated by reference herein.

BACKGROUND OF THE INVENTION

Field of the Invention

The disclosure generally relates to a communication device, and more particularly, to a communication device with high radiation efficiency.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna used for signal reception and transmission has insufficient radiation efficiency, it may degrade the communication quality of the relative device in which it is installed. Accordingly, it has become a critical challenge for designers to design a communication device with high radiation efficiency.

BRIEF SUMMARY OF THE INVENTION

In an exemplary embodiment, the invention is directed to a communication device that includes a click pad frame, a metal wall, and an antenna structure. The metal wall is coupled to the click pad frame. The antenna structure is coupled to the click pad frame. The click pad frame is disposed between the metal wall and the antenna structure.

In some embodiments, a one-piece design is formed by the click pad frame, the metal wall, and the antenna structure.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
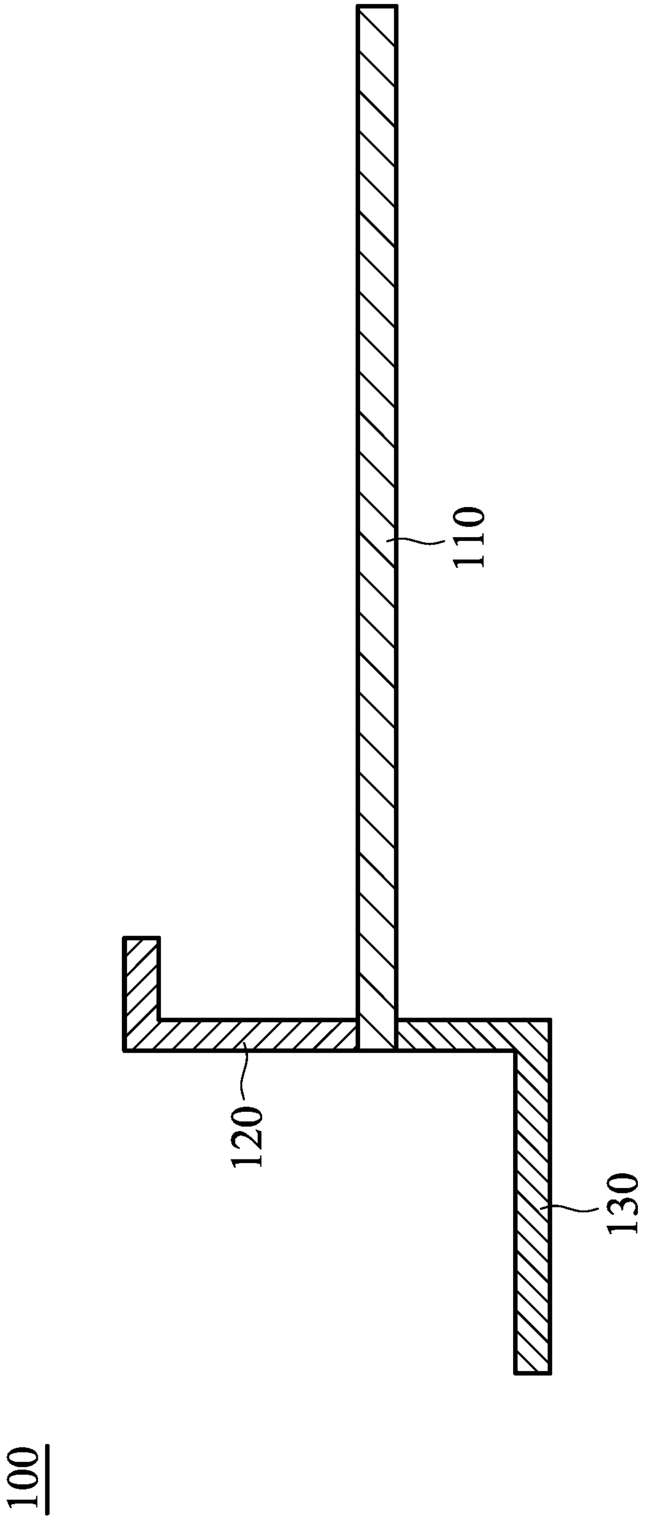
FIG. 1 is a sectional view of a communication device according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a sectional view of a communication device 100 according to an embodiment of the invention. The communication device 100 may be applied to a mobile device, such as a notebook computer, a smart phone, or a tablet computer, but it is not limited thereto. As shown in FIG. 1, the communication device 100 at least includes a click pad frame 110, a metal wall 120, and an antenna structure 130. The click pad frame 110 and the antenna structure 130 may both be made of metal materials, such as copper, silver, aluminum, iron, or their alloys.

The shapes and styles of the click pad frame 110, the metal wall 120, and the antenna structure 130 are not limited in the invention. The metal wall 120 is coupled to the click pad frame 110. The antenna structure 130 is also coupled to the click pad frame 110. The click pad frame 110 is disposed between the metal wall 120 and the antenna structure 130. In some embodiments, a one-piece design is formed by the click pad frame 110, the metal wall 120, and the antenna structure 130. For example, the above three elements may be manufactured and formed by a single metal piece after it is cut and bent. In some embodiments, the metal wall 120 extends from the click pad frame 110 toward a first direction, and the antenna structure 130 extends from the click pad frame 110 toward a second direction. The second direction may be different from or opposite to the first direction.

According to practical measurements, the incorporation of the metal wall 120 can prevent the antenna structure 130 from being interfered with by other nearby electronic components. Thus, the whole radiation efficiency of the communication device 100 can be significantly increased. Furthermore, since the antenna structure 130 is integrated with the click pad frame 110, the whole manufacturing cost of the communication device 100 can be further reduced.

The following embodiments will introduce different configurations and detailed structural features of the communication device 100. It should be understood that these figures and descriptions are merely exemplary, rather than limitations of the invention.

Figure 2A:
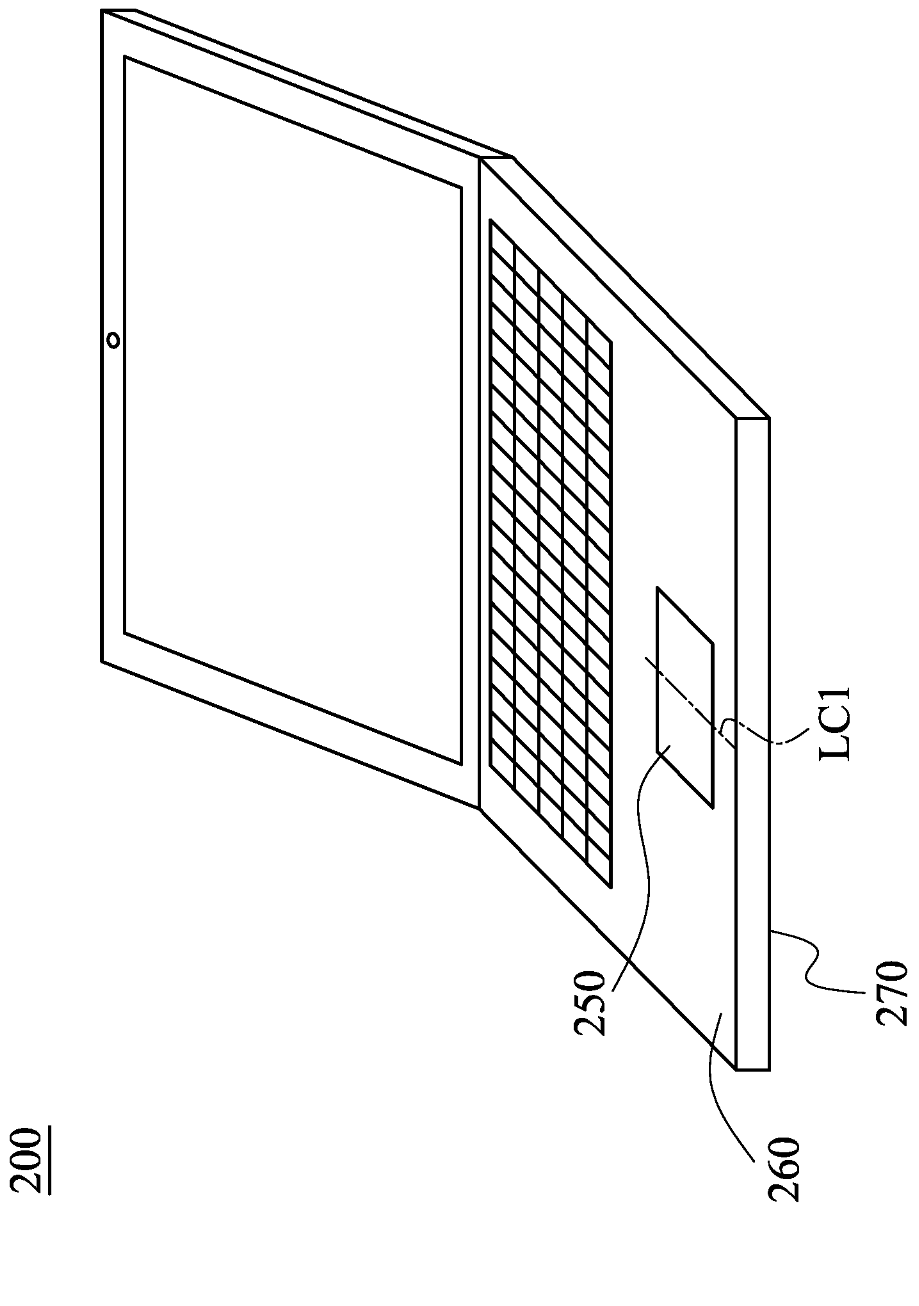
FIG. 2A is a perspective view of a communication device according to an embodiment of the invention.
Figure 2B:
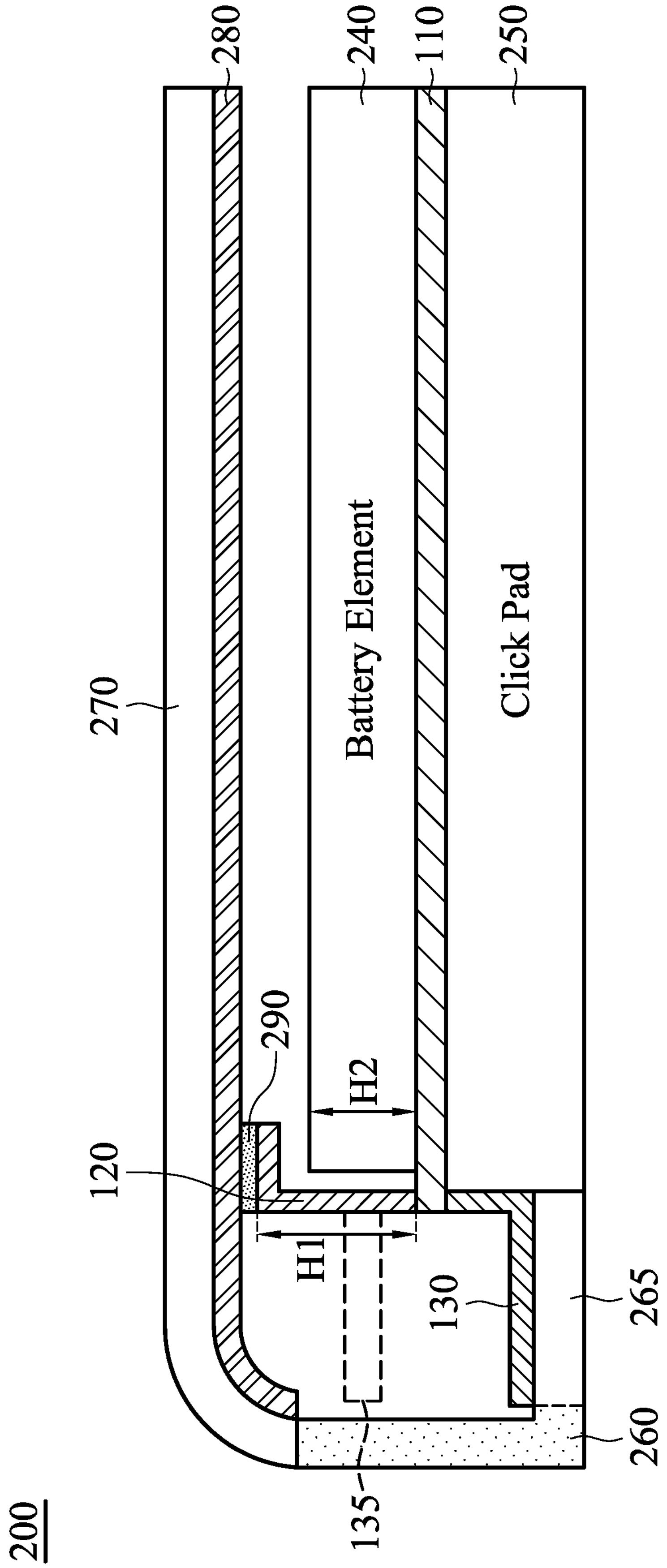
FIG. 2B is a sectional view of a communication device according to an embodiment of the invention.

FIG. 2A is a perspective view of the communication device 100 according to an embodiment of the invention. FIG. 2B is a sectional view of the communication device 100 according to an embodiment of the invention (along a sectional line LC1 of FIG. 2A). Please refer to FIG. 2A and FIG. 2B together. FIG. 2A and FIG. 2B are similar to FIG. 1. In the embodiment of FIG. 2A and FIG. 2B, the communication device 200 further includes a battery element 240, a click pad 250, a top housing 260, a bottom housing 270, and a metal layer 280. It should be understood that a system housing of the communication device 200 includes the top housing 260 and the bottom housing 270, which are equivalent to the so-called "C-component" and "D-component" in the field of notebook computers, respectively. Generally, the other components of the communication device 200 are all positioned in the internal space which are defined by the top housing 260 and the bottom housing 270.

The battery element 240 can provide electric power for the communication device 200. The battery element 240 is disposed at a side (e.g., the top side) of the click pad frame 110. The battery element 240 is adjacent to the metal wall 120. It should be noted that the term "adjacent" or "close" over the disclosure means that the distance (spacing) between two corresponding elements is smaller than a predetermined distance (e.g., 10 mm or the shorter), or means that the two corresponding elements directly touch each other (i.e., the aforementioned distance/spacing between them is reduced to 0). For example, the height H1 of the metal wall 120 may be greater than the height H2 of the battery element 240, so as to block the relative noise from the battery element 240. For example, the height H1 of the metal wall 120 may be from 2 mm to 15 mm. In some embodiments, the vertical projection 135 of the antenna structure 130 does not overlap the battery element 240 at all, so as to minimize the interference caused by the battery element 240 and its relative circuit board (not shown). It should be understood that the battery element 240 is merely an optional component, which is omitted in other embodiments.

The click pad 250 is configured to receive a user input. For example, when a finger of a user touches the click pad 250, the click pad 250 can generate a corresponding input signal. The click pad 250 is disposed at an opposite side (e.g., the bottom side) of the click pad frame 110. The click pad 250 is adjacent to the antenna structure 130. In other words, the click pad frame 110 can separate the click pad 250 from the battery element 240. In some embodiments, the click pad frame 110 is configured to support and fix the click pad 250. The vertical projection of the click pad 250 at least partially overlaps the click pad frame 110. The top housing 260 is adjacent to both of the antenna structure 130 and the click pad 250. In some embodiments, the top housing 260 further includes a nonconductive antenna window 265 corresponding to the antenna structure 130, such that the relative electromagnetic signals of the antenna structure 130 can be transmitted through the nonconductive antenna window 265. For example, the nonconductive antenna window 265 may be substantially aligned with the antenna structure 130, but they are not limited thereto.

The bottom housing 270 is adjacent to the click pad frame 110. The bottom housing 270 can be made of a carbon fiber material. The metal layer 280 is attached to the bottom housing 270. The metal layer 280 is disposed between the bottom housing 270 and the click pad frame 110. In some embodiments, the metal layer 280 can be formed on the bottom housing 270 by using the technology of sputter deposition. In alternative embodiments, the metal layer 280 can be a ground copper foil disposed on the bottom housing 270.

The metal wall 120 is further coupled to the metal layer 280. In some embodiments, the metal wall 120 is coupled through a conductive gasket 290 to the metal layer 280. The conductive gasket 290 is configured to compensate the manufacturing tolerance of the communication device 200. In some embodiments, the metal wall 120 can be directly connected to the metal layer 280, or the metal wall 120 can be fixed onto the metal layer 280 using a screw element (not shown). According to practical measurements, if the metal wall 120 and the metal layer 280 are coupled with each other, it can effectively prevent the bottom housing 270 from negatively affecting the radiation pattern of the antenna structure 130. Other features of the communication device 200 of FIG. 2A and FIG. 2B are similar to those of the communication device 100 of FIG. 1. Accordingly, the two embodiments can achieve similar levels of performance.

Figure 3:
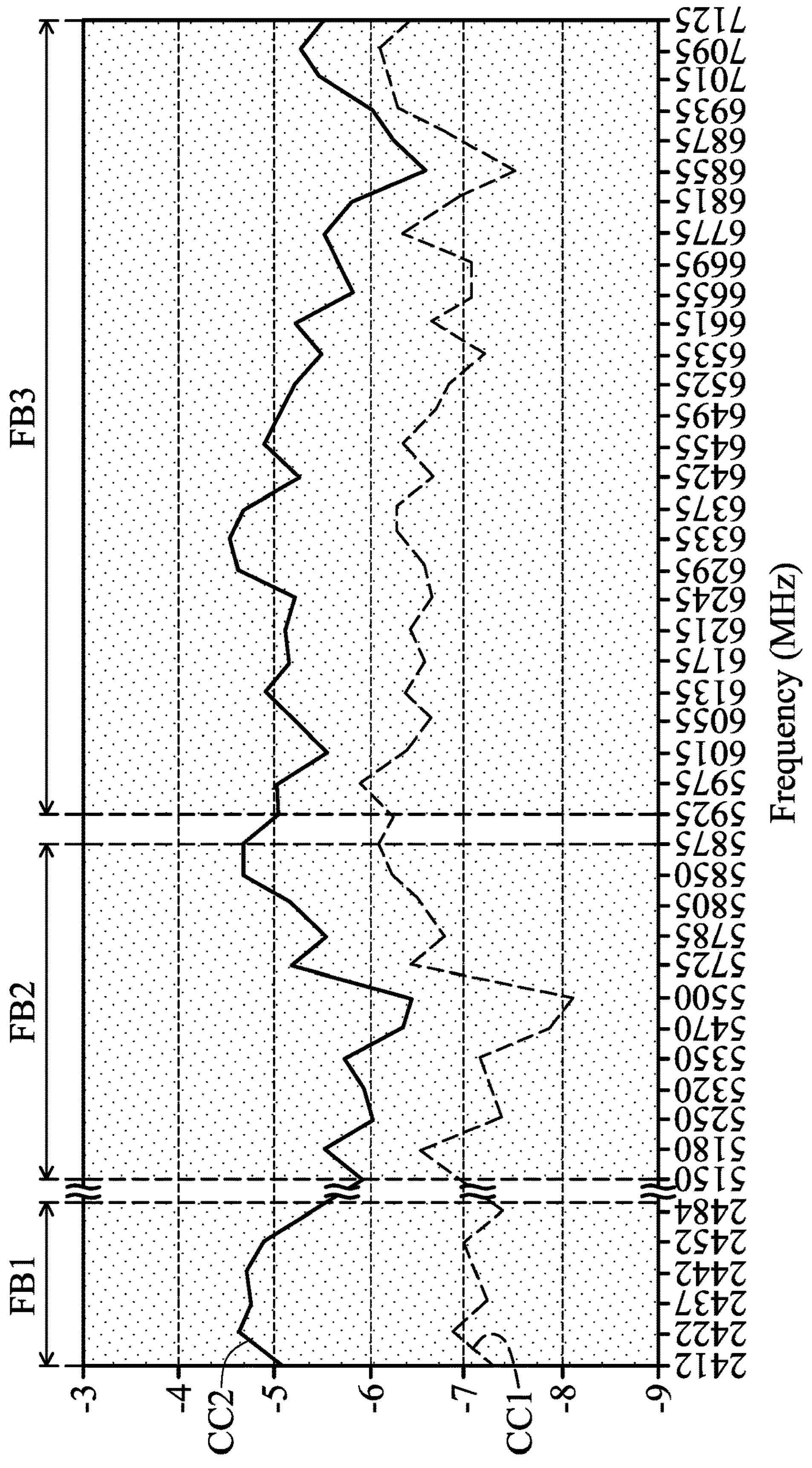
FIG. 3 is a diagram of radiation efficiency of an antenna structure of a communication device according to an embodiment of the invention.

FIG. 3 is a diagram of radiation efficiency of the antenna structure 130 of the communication device 200 according to an embodiment of the invention. The horizontal axis represents the operational frequency (MHz), and the vertical axis represents the radiation efficiency (dB). As shown in FIG. 3, a first curve CC1 represents the operational characteristics of the antenna structure 130 when the communication device 200 does not use the metal wall 120, and a second curve CC2 represents the operational characteristics of the antenna structure 130 when the communication device 200 already uses the metal wall 120. According to the measurement of FIG. 3, the antenna structure 130 of the communication device 200 can cover a first frequency band FB1, a second frequency band FB2, and a third frequency band FB3. For example, the first frequency band FB1 may be from 2400 MHz to 2500 MHz, the second frequency band FB2 may be from 5150 MHz to 5875 MHz, and the third frequency band FB3 may be from 5925 MHz to 7125 MHz. Therefore, the communication device 200 can support at least the wideband operations of conventional WLAN (Wireless Local Area Network) and next-generation Wi-Fi 6E. In addition, by comparing the first curve CC1 with the second curve CC2, the incorporation of the metal wall 120 can help to improve the radiation efficiency of the antenna structure 130 by at least 1.5 dB, and it can meet the requirements of practical applications of general mobile communication devices.

Figure 4:
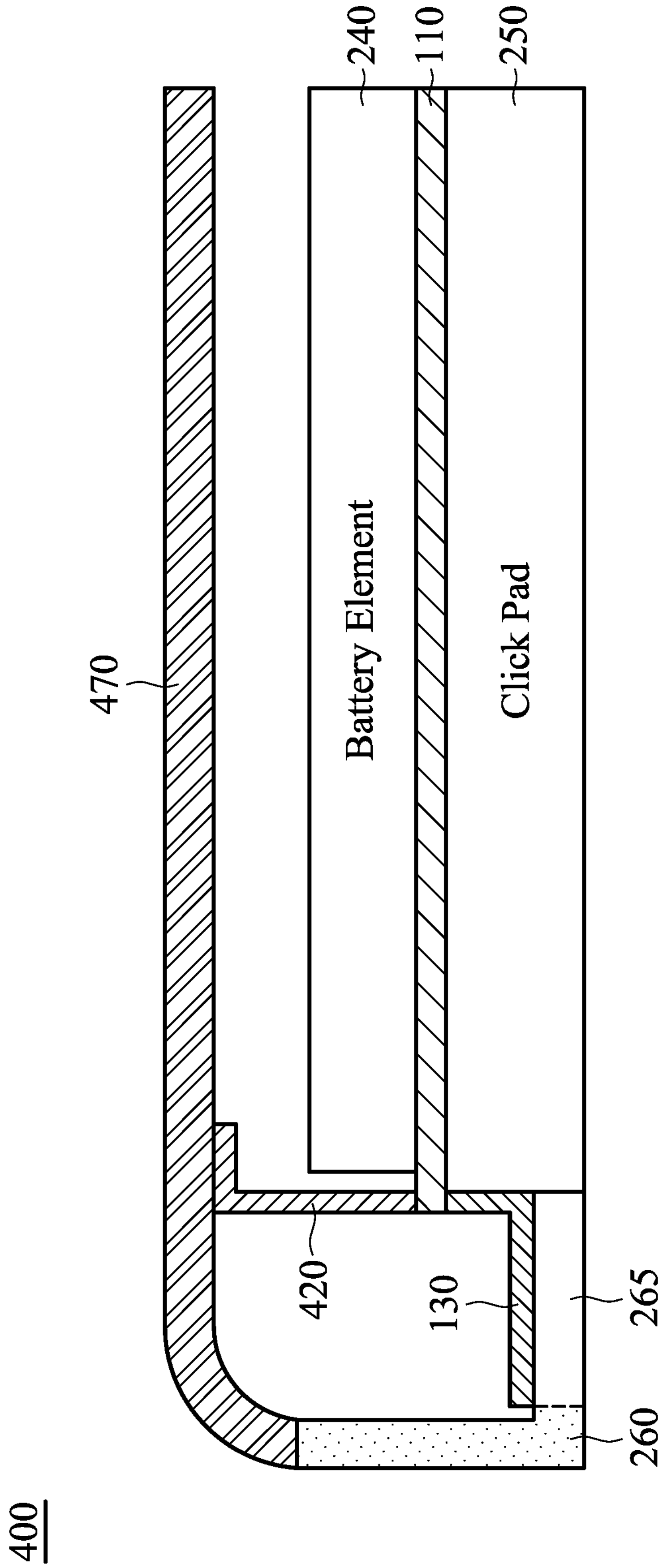
FIG. 4 is a sectional view of a communication device according to an embodiment of the invention.

FIG. 4 is a sectional view of a communication device 400 according to an embodiment of the invention. FIG. 4 is similar to FIG. 2A and FIG. 2B. In the embodiment of FIG. 4, the communication device 400 does not include the aforementioned metal layer 280, and a bottom housing 470 of the communication device 400 is made of a metal material. In addition, a metal wall 420 of the communication device 400 is further coupled to the bottom housing 470, so as to prevent the bottom housing 470 from negatively affecting the radiation pattern of the antenna structure 130. Other features of the communication device 400 of FIG. 4 are similar to those of the communication device 200 of FIG. 2A and FIG. 2B. Accordingly, the two embodiments can achieve similar levels of performance.

Figure 5:
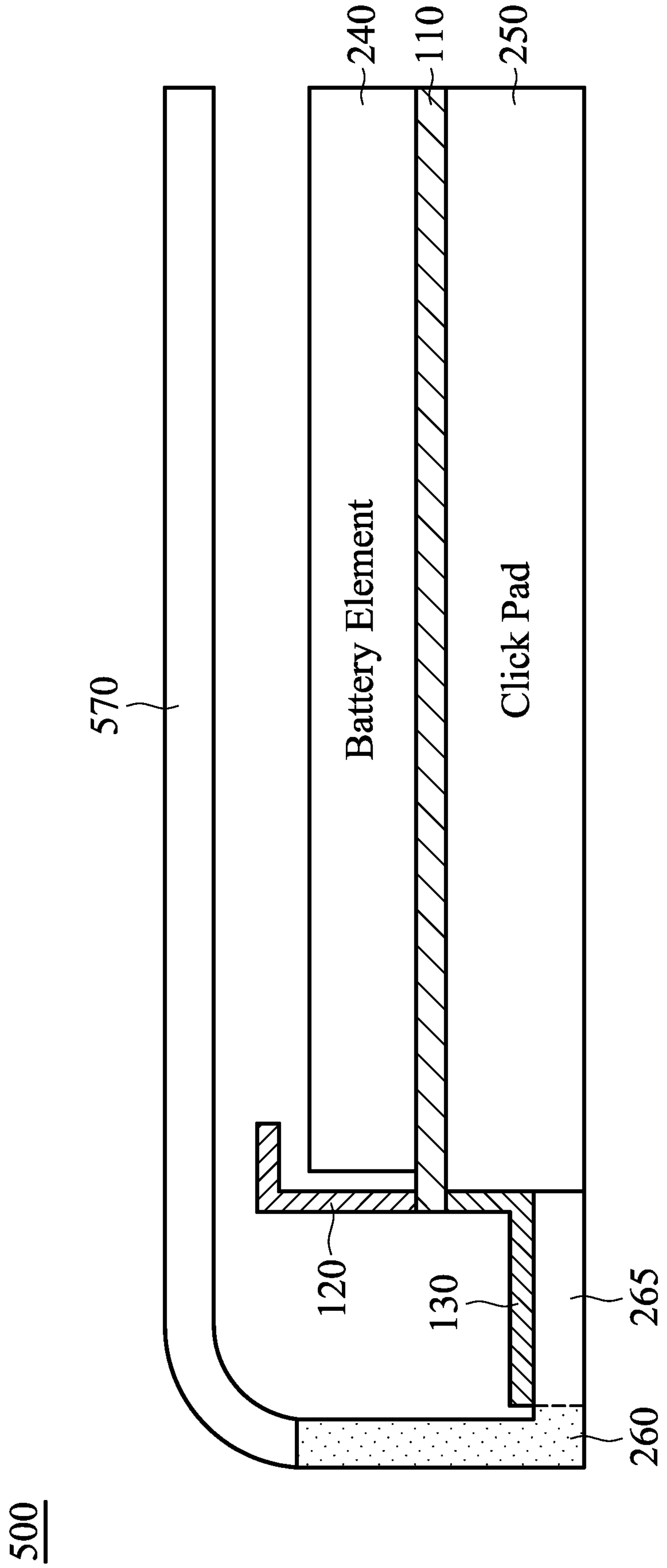
FIG. 5 is a sectional view of a communication device according to an embodiment of the invention.

FIG. 5 is a sectional view of a communication device 500 according to an embodiment of the invention. FIG. 5 is similar to FIG. 2A and FIG. 2B. In the embodiment of FIG. 5, the communication device 500 does not include the aforementioned metal layer 280, and a bottom housing 570 of the communication device 500 is made of a plastic material. With such a design, the metal wall 120 of the communication device 500 is also configured to minimize the interference caused by the battery element 240 and its relative circuit board (not shown). In alternative embodiments, the metal wall 120 directly extends toward the bottom housing 570. In other words, the metal wall 120 may not include any bending portions, without affecting its performance. Other features of the communication device 500 of FIG. 5 are similar to those of the communication device 200 of FIG. 2A and FIG. 2B. Accordingly, the two embodiments can achieve similar levels of performance.

Figure 6:
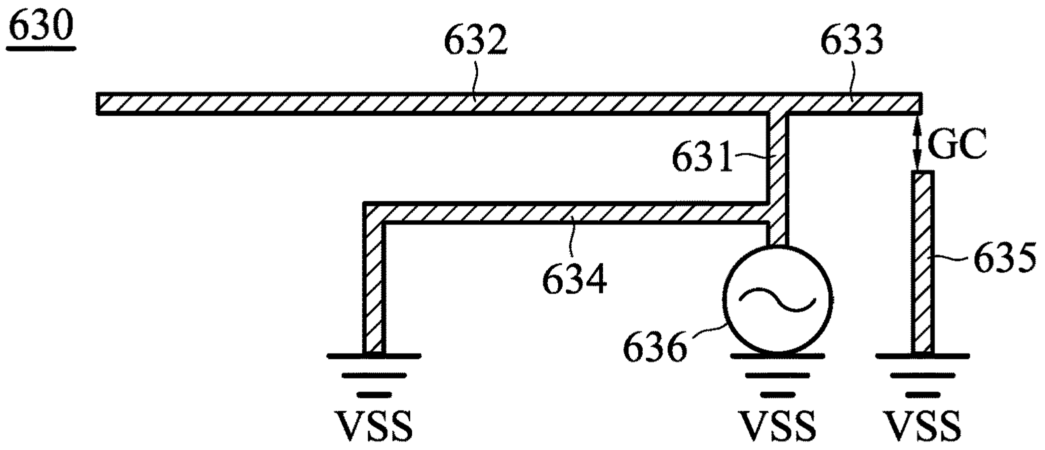
FIG. 6 is a diagram of an antenna structure according to an embodiment of the invention.

FIG. 6 is a diagram of an antenna structure 630 according to an embodiment of the invention. In the embodiment of FIG. 6, the antenna structure 630 is a PIFA (Planar Inverted F Antenna). Specifically, the antenna structure 630 includes a feeding radiation element 631, a first radiation element 632, a second radiation element 633, a shorting radiation element 634, and a parasitic radiation element 635. The feeding radiation element 631 is coupled to a signal source 636. The first radiation element 632 is coupled to the feeding radiation element 631. The second radiation element 633 is coupled to the feeding radiation element 631. The second radiation element 633 and the first radiation element 632 may substantially extend in opposite directions. The feeding radiation element 631 is further coupled through the shorting radiation element 634 to a ground voltage VSS. For example, the ground voltage VSS may be provided by the click pad frame 110, the metal wall 120, or the metal layer 280 as mentioned above. The parasitic radiation element 635 is adjacent to the second radiation element 633. A coupling gap GC may be formed between the parasitic radiation element 635 and the second radiation element 633. In some embodiments, the second radiation element 633 and the parasitic radiation element 635 are configured to cover the second frequency band FB2 and the third frequency band FB3 as mentioned above. It should be understood that the antenna structure 630 can be applied to the communication device 100, 200, 400 or 500 as mentioned above.

Figure 7:
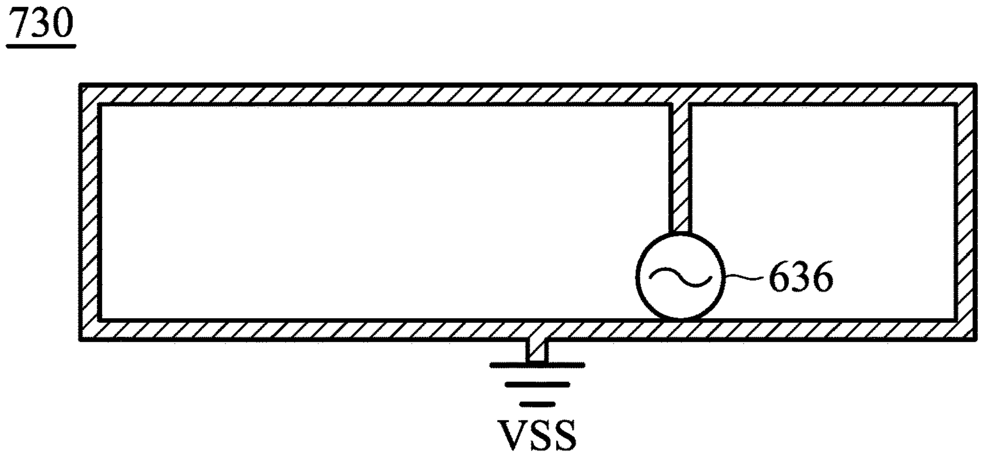
FIG. 7 is a diagram of an antenna structure according to an embodiment of the invention.

FIG. 7 is a diagram of an antenna structure 730 according to an embodiment of the invention. In the embodiment of FIG. 7, the antenna structure 730 is a loop antenna. The ground voltage VSS of the antenna structure 730 may be provided by the click pad frame 110, the metal wall 120, or the metal layer 280 as mentioned above. It should be understood that the antenna structure 730 can be applied to the communication device 100, 200, 400 or 500 as mentioned above.

Figure 8:
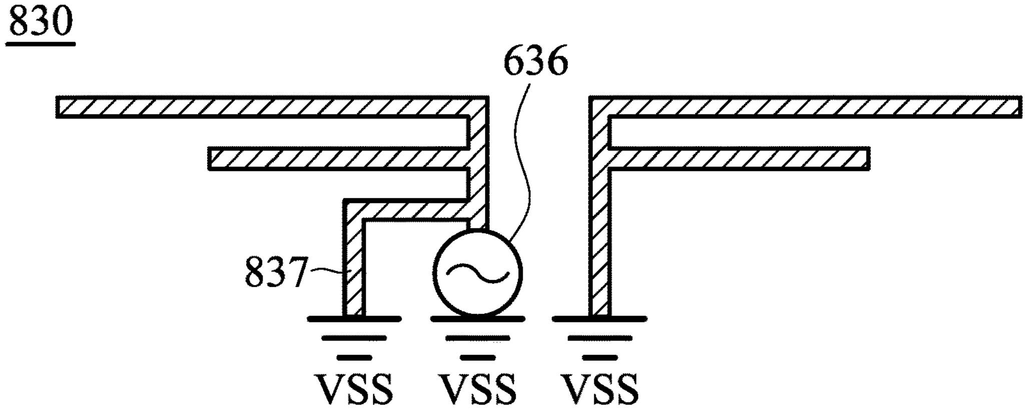
FIG. 8 is a diagram of an antenna structure according to an embodiment of the invention.

FIG. 8 is a diagram of an antenna structure 830 according to an embodiment of the invention. In the embodiment of FIG. 8, the antenna structure 830 is a dipole antenna, which is further coupled through a Balun element 837 to the ground voltage VSS. The Balun element 837 is configured to fine-tune the impedance matching of the antenna structure 830. In addition, the ground voltage VSS of the antenna structure 830 may be provided by the click pad frame 110, the metal wall 120, or the metal layer 280 as mentioned above. It should be understood that the antenna structure 830 can be applied to the communication device 100, 200, 400 or 500 as mentioned above.

Figure 9:
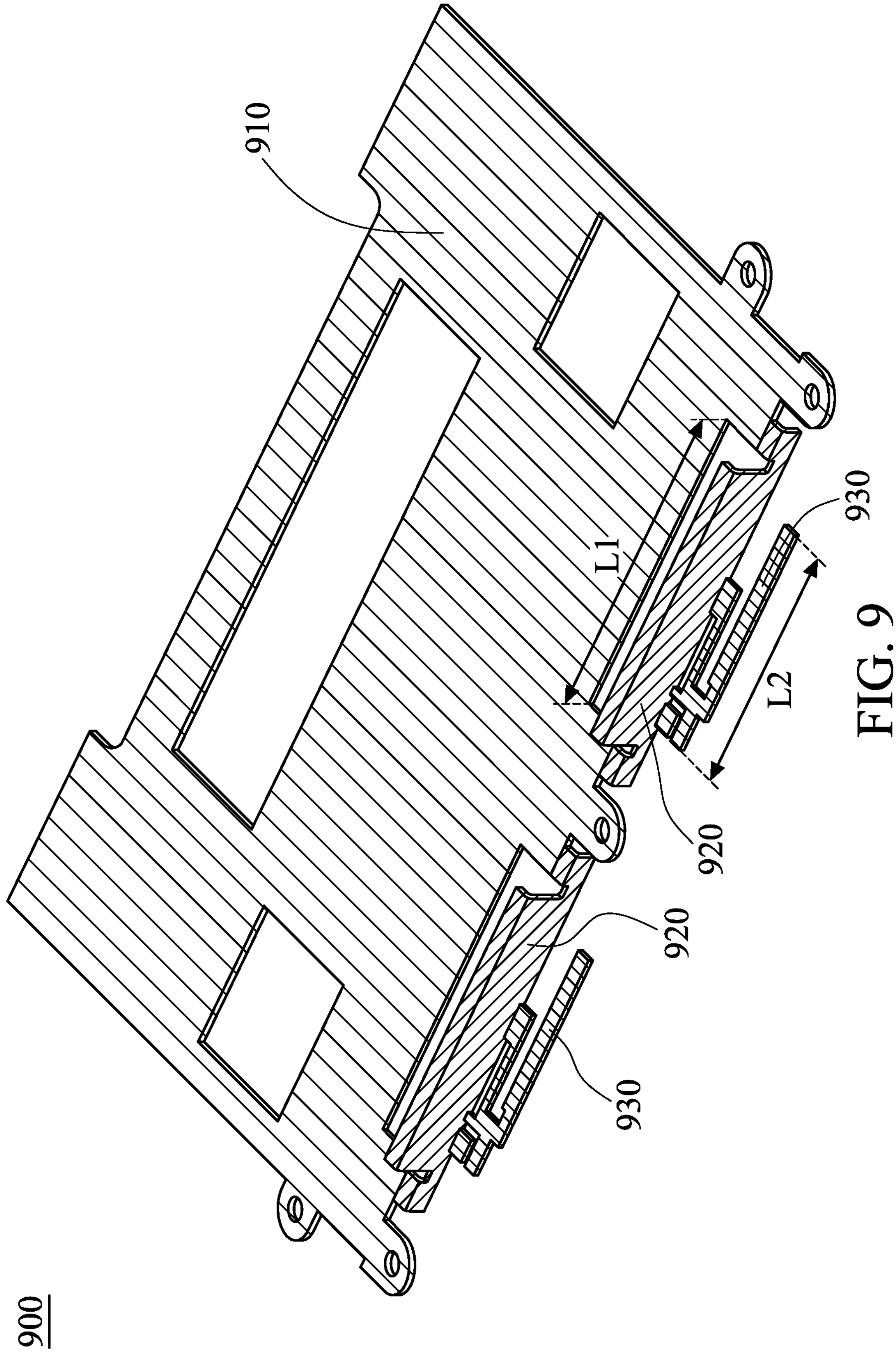
FIG. 9 is a perspective view of a communication device according to an embodiment of the invention.

FIG. 9 is a perspective view of a communication device 900 according to an embodiment of the invention. FIG. 9 is similar to FIG. 1. In the embodiment of FIG. 9, the communication device 900 includes a click pad frame 910, one or more metal walls 920, and one or more antenna structures 930. In order to effectively suppress noise and interference, the length L1 of the metal wall 920 is longer than the length L2 of the antenna structure 930. For example, the length L1 of the metal wall 920 may be from 10 mm to 60 mm. In alternative embodiments, the communication device 900 further includes more metal walls 920 and their corresponding antenna structures 930, so as to meet a variety of application requirements. Other features of the communication device 900 of FIG. 9 are similar to those of the communication device 100 of FIG. 1. Accordingly, the two embodiments can achieve similar levels of performance.

The invention proposes a novel communication device. In comparison to the conventional design, the invention has at least the advantages of increasing the radiation efficiency, simplifying the manufacturing process, and reducing the manufacturing cost. Therefore, the invention is suitable for application in a variety of devices.

Note that the above element sizes, element shapes, and frequency ranges are not limitations of the invention. An antenna designer can fine-tune these settings or values in order to meet specific requirements. It should be understood that the communication device of the invention is not limited to the configurations depicted in FIGS. 1-9. The invention may merely include any one or more features of any one or more embodiments of FIGS. 1-9. In other words, not all of the features displayed in the figures should be implemented in the communication device of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A communication device, comprising:

a click pad frame;

a metal wall, coupled to the click pad frame; and an antenna structure, coupled to the click pad frame;

wherein the click pad frame is disposed between the metal wall and the antenna structure;

wherein a one-piece design is formed by the click pad frame, the metal wall, and the antenna structure;

wherein both the metal wall and the antenna structure are positioned at a same edge of the click pad frame;

wherein the metal wall extends from the click pad frame toward a first direction, and the antenna structure extends from the click pad frame toward a second direction which is opposite to the first direction.

2. The communication device as claimed in claim 1, wherein the antenna structure covers a first frequency band, a second frequency band, and a third frequency band, the first frequency band is from 2400 MHz to 2500 MHz, the second frequency band is from 5150 MHz to 5875 MHz, and the third frequency band is from 5925 MHz to 7125 MHz.

3. The communication device as claimed in claim 1, further comprising:

a battery element, disposed at a side of the click pad frame, wherein the battery element is adjacent to the metal wall.

4. The communication device as claimed in claim 3, wherein a vertical projection of the antenna structure does not overlap the battery element at all.

5. The communication device as claimed in claim 3, wherein a height of the metal wall is greater than that of the battery element.

6. The communication device as claimed in claim 1, further comprising:

a bottom housing, wherein the bottom housing is adjacent to the click pad frame.

7. The communication device as claimed in claim 6, wherein the bottom housing is made of a carbon fiber material.

8. The communication device as claimed in claim 7, further comprising:

a metal layer, attached to the bottom housing, wherein the metal layer is disposed between the bottom housing and the click pad frame.

9. The communication device as claimed in claim 8, wherein the metal wall is further coupled to the metal layer.

10. The communication device as claimed in claim 6, wherein the bottom housing is made of a metal material.

11. The communication device as claimed in claim 10, wherein the metal wall is further coupled to the bottom housing.

12. The communication device as claimed in claim 6, wherein the bottom housing is made of a plastic material.

13. The communication device as claimed in claim 1, further comprising:

a click pad, disposed at another side of the click pad frame, wherein the click pad is adjacent to the antenna structure.

14. The communication device as claimed in claim 13, further comprising:

a top housing, wherein the top housing is adjacent to the antenna structure and the click pad.

15. The communication device as claimed in claim 14, wherein the top housing further comprises a nonconductive antenna window corresponding to the antenna structure.

16. The communication device as claimed in claim 1, wherein the antenna structure is a PIFA (Planar Inverted F Antenna).

17. The communication device as claimed in claim 1, wherein the antenna structure is a loop antenna.

18. The communication device as claimed in claim 1, wherein the antenna structure is a dipole antenna.

19. The communication device as claimed in claim 1, wherein a length of the metal wall is longer than that of the antenna structure.

20. A communication device, comprising:

a click pad frame;

a metal wall, coupled to the click pad frame; and an antenna structure, coupled to the click pad frame;

wherein the click pad frame is disposed between the metal wall and the antenna structure;

wherein a one-piece design is formed by the click pad frame, the metal wall, and the antenna structure;

wherein both the metal wall and the antenna structure are positioned at a same edge of the click pad frame;

wherein the metal wall comprises a first portion and a second portion, the first portion is perpendicular to the click pad frame, and the second portion is parallel to the click pad frame;

wherein the antenna structure comprises a third portion and a fourth portion, the third portion is perpendicular to the click pad frame, and the fourth portion is parallel to the click pad frame.

* * * * *